United States Patent
Lv (10) Patent No.: US 12,479,484 B2
(45) Date of Patent: Nov. 25, 2025

(54) CART

(71) Applicant: YONGKANG ZHUOYI LEISURE PRODUCTS CO., LTD., Jinhua (CN)

(72) Inventor: Zhaocheng Lv, Jinhua (CN)

(73) Assignee: YONGKANG ZHUOYI LEISURE PRODUCTS CO., LTD.

(*) Notice: Subject to any disclaimer, the term of this patent is extended or adjusted under 35 U.S.C. 154(b) by 288 days.

(21) Appl. No.: 18/465,184

(22) Filed: Sep. 12, 2023

(65) Prior Publication Data
US 2025/0065931 A1    Feb. 27, 2025

(30) Foreign Application Priority Data
Aug. 21, 2023    (CN) .......... 202322263535.5

(51) Int. Cl.
| | |
|---|---|
| B62B 1/12 | (2006.01) |
| B62B 1/00 | (2006.01) |
| B62B 1/14 | (2006.01) |
| B62B 1/26 | (2006.01) |
| B62B 5/06 | (2006.01) |

(52) U.S. Cl.
CPC .............. B62B 1/125 (2013.01); B62B 1/008 (2013.01); B62B 1/14 (2013.01); B62B 1/266 (2013.01); B62B 5/065 (2013.01)

(58) Field of Classification Search
CPC .. B62B 1/125; B62B 1/12; B62B 1/10; B62B 1/008; B62B 1/14; B62B 1/266; B62B 1/26; B62B 5/065; B62B 5/064
See application file for complete search history.

(56) References Cited

U.S. PATENT DOCUMENTS

| | | | | |
|---|---|---|---|---|
| 5,816,374 | A * | 10/1998 | Hsien ............. | A45C 5/14 190/115 |
| 7,143,912 | B2 * | 12/2006 | Caneba ............ | B62J 7/00 280/654 |
| 8,641,056 | B1 * | 2/2014 | Carter ............. | B62B 1/26 280/30 |
| 11,453,428 | B2 * | 9/2022 | Bradley .......... | B62B 5/068 |
| 11,738,787 | B1 * | 8/2023 | Lindsey .......... | B62B 1/12 280/30 |
| 12,233,926 | B2 * | 2/2025 | Su ................... | B62B 5/066 |
| 2010/0327562 | A1 * | 12/2010 | Kasuya .......... | A45C 5/14 280/47.131 |

* cited by examiner

Primary Examiner — John D Walters (57) ABSTRACT

A cart includes a pull rod mechanism, a folding bracket mechanism, and a pull rod locking apparatus. The pull rod mechanism includes main and sub-pipes connected telescopically. The folding bracket mechanism includes a bearing frame, connecting rods, and connecting elements. The bearing frame and the connecting rod are rotationally connected to the main pipe. The connecting element is rotationally connected to the bearing frame and connecting rod. The pull rod locking apparatus includes a mounting frame, sliding rods, and a knob. The mounting frame is fixedly connected between two main pipes and is symmetrically provided with two sliding grooves. Two sliding rods are provided and slidably connected in two sliding grooves. The knob includes a lock block circumferentially provided with far and near ends. When the knob is rotated until the far end abuts against sliding rod, an end of the sliding rod tightly abuts and locks the sub-pipe.

8 Claims, 8 Drawing Sheets

CART

TECHNICAL FIELD

The present disclosure relates to the field of carriers, and in particular to a cart.

BACKGROUND

Pull rods are usually arranged on products, such as suitcases and carts, and are convenient for users to grasp and push or drag articles. In order to adapt to users of different body forms to use pull rods, a pull rod usually has a telescopic structure, and the pull rod is further provided with a pull rod locking apparatus for locking the telescopic structure. Usually, the pull rod locking apparatus includes elastic convex points and several grooves, and the convex points are clamped in different grooves to lock pull rods of different lengths. However, by using this structure, the pull rod can only be locked on several fixed lengths, which cannot meet the usage habits of more users of different body forms and cannot realize stepless locking. Moreover, it is difficult to operate the elastic convex points and clamp the elastic convex points into the grooves again, and the use is inconvenient.

A cart is usually provided with a support frame for placing articles. A support frame on a traditional cart is rigid as a whole and cannot be folded, so that the cart in an idle state occupies a relatively large space.

How to design a cart with a small overall volume in a folded state and having a pull rod convenient for users to realize stepless adjustment in an unfolded state is a challenge that designers still need to solve.

SUMMARY

In order to solve the above problems, the present disclosure provides a cart which solves the problems that a traditional cart cannot be folded integrally, and stepless adjustment of a pull rod on the traditional cart cannot be realized.

The present disclosure adopts the following technical solutions: a cart includes a pull rod mechanism, a folding bracket mechanism, and a pull rod locking apparatus.

The pull rod mechanism includes main pipes and sub-pipes connected telescopically. One end of the sub-pipe is inserted into the main pipe. Two main pipes and two sub-pipes are provided.

The folding bracket mechanism includes a bearing frame, connecting rods, and connecting elements. The bearing frame is rotationally connected to the main pipe. The connecting rod is rotationally connected to the main pipe. The connecting element is rotationally connected to the bearing frame and the connecting rod simultaneously. The connecting element is fixedly connected with a support frame. A transverse rod is arranged on the main pipe. The transverse rod is rotationally connected with rollers. The main pipe, the bearing frame, the connecting rod, and the connecting element form a four-rod mechanism. The bearing frame is detachably connected with a support plate. A plurality of buckles are arranged at a bottom of the support plate. The whole bearing frame is U-shaped. A shape of the buckle is adapted to a cross-sectional shape of the bearing frame.

The pull rod locking apparatus includes a mounting frame, sliding rods, and a knob. The mounting frame is fixedly connected between the two main pipes. The mounting frame is symmetrically provided with two sliding grooves. Two sliding rods are provided and are slidably connected in the two sliding grooves respectively. The knob includes a lock block. The lock block is circumferentially provided with far ends and near ends. A distance between the far end and a rotation axis of the knob is greater than a distance between the near end and the rotation axis of the knob. Two far ends and two near ends are provided, and both the two far ends and the two near ends are symmetrical around a center of the rotation axis of the knob. When the knob is rotated until the far end abuts against the sliding rod, an end of the sliding rod tightly abuts and locks the sub-pipe.

Through the above technical solution, the main pipe, the bearing frame, the connecting rod, and the connecting element form a four-rod mechanism, so that the cart provided by the present disclosure can be folded to facilitate the overall storage and movement of the cart. When the lock block is rotated to different angles, the far end or near end abuts against the sliding rod to enable the sliding rods on both sides to tightly abut and lock simultaneously or unlock the sub-pipe, and a user can rotate the knob to realize the locking or unlocking of the sub-pipe relative to the main pipe, so the use is very convenient. The sub-pipe can slide to any position in a route relative to the main pipe and can be tightly abutted and locked by the sliding rod, and stepless locking of the sub-pipe and the main pipe can be realized, so that the present disclosure can adapt to the usage habits of users of more body forms.

Further, the knob further includes an intermediate disc and a strip-shaped gripping part. The gripping part and the lock block are respectively located on two sides of the intermediate disc. The gripping part and the intermediate disc are respectively provided with an open state identifier and a locked state identifier. Indicated orientations of the locked state identifier and the open state identifier are perpendicular to each other. A current state identifier is arranged on the mounting frame.

Through the above technical solution, the knob can be rotated to enable the open state identifier or the locked state identifier to point to the current state identifier, and then, whether the sliding rod and the sub-pipe are in an unlocked state or a locked state can be visually displayed, so the user is convenient to observe and use.

Further, the knob includes a plurality of clamping hooks. The clamping hook includes a hook portion and a neck portion. The mounting frame is provided with a shaft hole. The neck portion is rotationally connected to the shaft hole. An avoidance gap is formed between adjacent clamping hooks. The hook portion is provided with a conical surface.

Through the above technical solution, the clamping hook passes through the shaft hole and can be rotationally connected to the shaft hole by the neck portion, and the clamping hook has a simple structure and is easy to process and produce. In the process of extending the clamping hook into the shaft hole, the inside of the shaft hole passes through the conical surface, and the avoidance gap shrinks inwards until the neck portion is clamped in the shaft hole, thereby facilitating the clamped mounting of the clamping hook and the shaft hole.

Further, the mounting frame is provided with mounting cylinders for the sub-pipes to pass through. The mounting cylinder is provided with an avoidance hole. The avoidance hole is in communication with the mounting cylinder and the sliding groove.

Through the above technical solution, when the sliding rod tightly abuts and locks the sub-pipe, the mounting cylinder can provide a radial force to support the sub-pipe, so that the locked state of the sub-pipe is more stable.

Further, a contour of the lock block in a circumferential direction is racetrack-shaped, diamond-shaped, or elliptical.

Through the above technical solution, the lock block has a simple shape and is easy to process. All parts on the contour of the lock block in the circumferential direction are symmetrical around a center of the rotation axis of the lock block, so that the lock block at any angle has the same limiting effect on the sliding rods on both sides.

Further, the connecting element is fixedly connected with a support frame, and the connecting element is provided with a notch. When the bearing frame is clamped in the notch, the bearing frame is unfolded outwards to a limit state. When the bearing frame is folded to a limit state, a spatial plane where the bearing frame is located is parallel to a spatial plane where the support frame is located.

Through the above technical solution, when the notch is clamped with the bearing frame, a maximum unfolding angle of the bearing frame is limited, so that the bearing frame is more convenient to unfold. When the bearing frame is folded to the limit state, the spatial plane where the bearing frame is located is parallel to the spatial plane where the support frame is located, so that the space volume occupied by the cart in a folded state is smaller.

Further, the cart further includes an accommodating bag. The accommodating bag includes a bag body, hanging straps, and a connecting strap. Both ends of the connecting strap are connected to the bag body. The main pipe is located between the bag body and the connecting strap. Two ends of the hanging strap are connected to the bag body and the connecting strap. The hanging strap is hung on the mounting frame.

Through the above technical solution, the capability of the present disclosure to accommodate articles is increased, and the accommodating bag can be mounted more firmly by the arrangement of the hanging strap and the connecting strap.

Further, the mounting frame is provided with hooks.

Through the above technical solution, the hooks can be configured to hang articles, thereby increasing the capability of the present disclosure to carry articles.

DESCRIPTION OF DRAWINGS

In order to illustrate the technical solutions in the embodiments of the present disclosure or in the prior art more clearly, the accompanying drawings required for descriptions in the embodiments or the prior art will be briefly introduced below. It is apparent that the accompanying drawings in the following descriptions are only some embodiments of the present disclosure. Those of ordinary skill in the art can also obtain other accompanying drawings according to structures shown in these accompanying drawings without creative works.

The information of reference numbers of the present disclosure is as follows:

1. main pipe; 2. sub-pipe; 3. mounting frame; 4. sliding groove; 5. sliding rod; 6. knob; 7. mounting cylinder; 8. avoidance hole; 9. current state identifier; 10. shaft hole; 11. bearing frame; 12. connecting rod; 13. connecting element; 14. support frame; 15. notch; 16. support plate; 17. buckle; 18. accommodating bag; 19. transverse rod; 20. roller; 21. hook; 61. lock block; 611. far end; 612. near end; 62. intermediate disc; 63. gripping part; 64. clamping hook; 641. hook portion; 642. neck portion; 65. avoidance gap; 66. conical surface; 67. open state identifier; 68. locked state identifier; 181. bag body; 182. hanging strap; 183. connecting strap.

The implementation of objectives, functional characteristics, and advantages of the present disclosure will be further explained with reference to accompanying drawings in conjunction with embodiments.

DETAILED DESCRIPTION

The technical solutions in the embodiments of the present disclosure will be clearly and completely described below with reference to the accompanying drawings in the embodiments of the present disclosure. Obviously, the described embodiments are only a part of the embodiments of the present disclosure, rather than all the embodiments. Based on the embodiments in the present disclosure, all other embodiments obtained by those of ordinary skill in the art without creative efforts fall within the protection scope of the present disclosure.

It should be noted that all directional indications (such as up, down, left, right, front, rear, . . . ) in the embodiments of the present disclosure are only used for explaining the relative position relationship, motion situation, and the like, between various components in a specific posture (as shown in the accompanying drawings). If the specific posture changes, the directional indication also changes accordingly.

In addition, the descriptions of "first", "second", and the like involved in the present disclosure are for descriptive purposes only, and cannot be construed as indicating or implying relative importance or implying the number of indicated technical features. Thus, the features defined as "first" and "second" may explicitly or implicitly include at least one of the features. In addition, the technical solutions between various embodiments can be combined with each other on the basis of implementation by those of ordinary skill in the art. When the combination of technical solutions has a conflict or cannot be implemented, it should be considered that such combination of technical solutions does not exist and is not within the protection scope required by the present disclosure.

Referring to FIG. 1 to FIG. 7, a cart includes a pull rod mechanism, a folding bracket mechanism, and a pull rod locking apparatus.

The pull rod mechanism includes main pipes 1 and sub-pipes 2 connected telescopically. One end of the sub-pipe 2 is inserted into the main pipe 1. Two main pipes 1 and two sub-pipes 2 are provided.

The folding bracket mechanism includes a bearing frame 11, connecting rods 12, and connecting elements 13. The bearing frame 11 is rotationally connected to the main pipe 1. The connecting rod 12 is rotationally connected to the main pipe 1. The connecting element 13 is rotationally connected to the bearing frame 11 and the connecting rod 12 simultaneously. The connecting element 13 is fixedly connected with a support frame 14. A transverse rod 19 is arranged on the main pipe 1. The transverse rod 19 is rotationally connected with rollers 20. The main pipe 1, the bearing frame 11, the connecting rod 12, and the connecting element 13 form a four-rod mechanism. The bearing frame 11 is detachably connected with a support plate 16. A plurality of buckles 17 are arranged at a bottom of the support plate 16. The whole bearing frame 11 is U-shaped. A shape of the buckle 17 is adapted to a cross-sectional shape of the bearing frame 11.

The pull rod locking apparatus includes a mounting frame 3, sliding rods 5, and a knob 6. The mounting frame 3 is fixedly connected between the two main pipes 1. The mounting frame 3 is symmetrically provided with two sliding grooves 4. Two sliding rods 5 are provided and are slidably connected in the two sliding grooves 4 respectively. The knob 6 includes a lock block 61. The lock block 61 is circumferentially provided with far ends 611 and near ends 612. A distance between the far end 611 and a rotation axis of the knob 6 is greater than a distance between the near end 612 and the rotation axis of the knob 6. Two far ends 611 and two near ends 612 are provided, and both the two far ends 611 and the two near ends 612 are symmetrical around a center of the rotation axis of the knob 6. When the knob 6 is rotated until the far end 611 abuts against the sliding rod 5, an end of the sliding rod 5 tightly abuts and locks the sub-pipe 2.

The main pipe 1, the bearing frame 11, the connecting rod 12, and the connecting element 13 form a four-rod mechanism, so that the cart provided by the present disclosure can be folded to facilitate the overall storage and movement of the cart. When the lock block 61 is rotated to different angles, the far end 611 or near end 612 abuts against the sliding rod 5 to enable the sliding rods 5 on both sides to tightly abut and lock simultaneously or unlock the sub-pipe 2, and a user can rotate the knob 6 to realize the locking or unlocking of the sub-pipe 2 relative to the main pipe 1, so the use is very convenient. The sub-pipe 2 can slide to any position in a route relative to the main pipe 1 and can be tightly abutted and locked by the sliding rod 5, and stepless locking of the sub-pipe 2 and the main pipe 1 can be realized, so that the present disclosure can adapt to the usage habits of users of more body forms.

Preferably, a shape of an end surface of the sliding rod 5 close to the sub-pipe 2 is adapted to a shape of a side surface of the sub-pipe 2, thereby increasing the contact area between the sub-pipe 2 and the end of the sliding rod 5.

Preferably, the whole support frame 14 is U-shaped, and two ends of the support frame 14 are fixedly connected to the two connecting elements 13 respectively.

Two connecting rods 12 are provided and are connected to the two main pipes 1 respectively.

Figure 1:
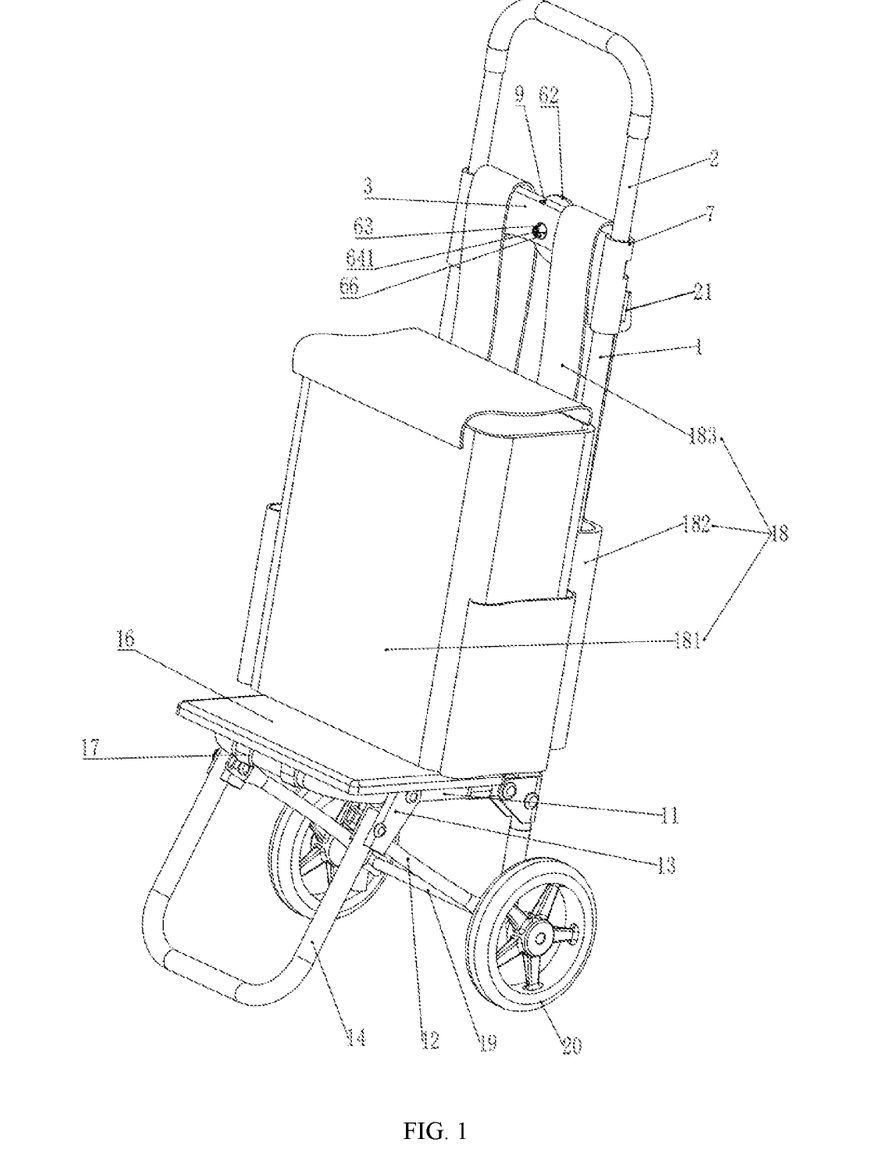
FIG. 1 is a first schematic view of a bearing frame in an unfolded state of the present disclosure.
Figure 2:
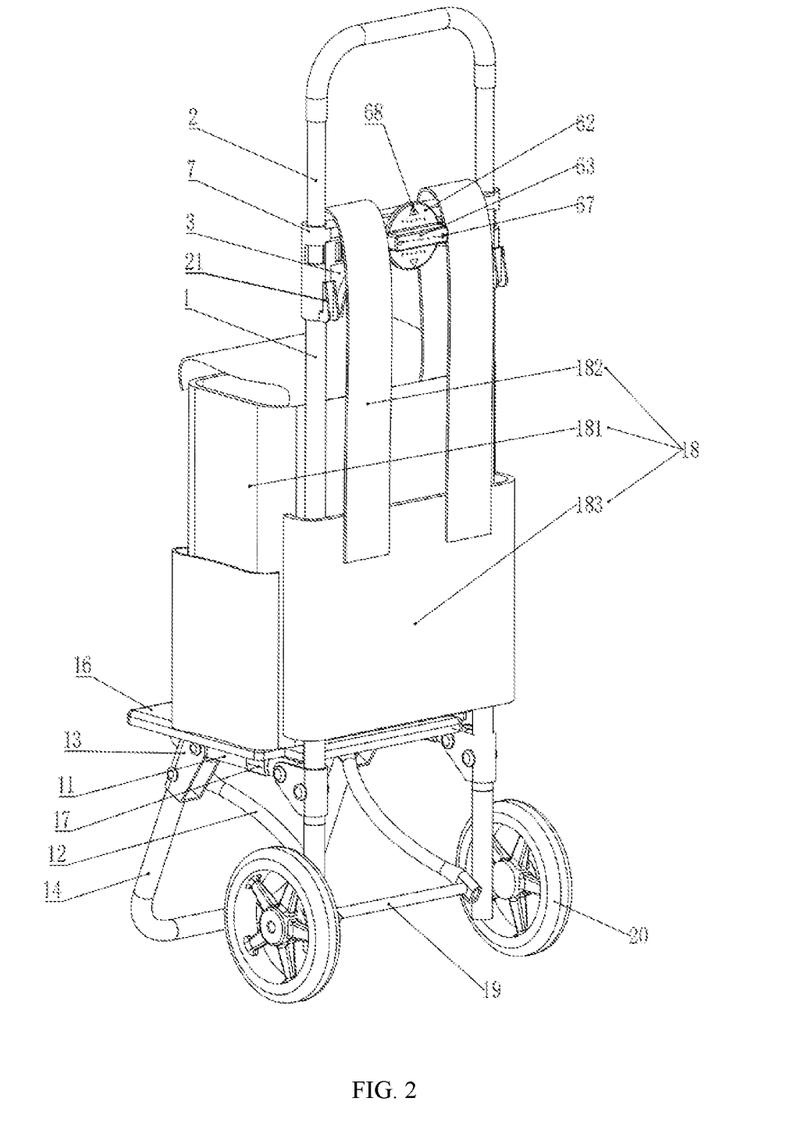
FIG. 2 is a second schematic view of the bearing frame in an unfolded state of the present disclosure.
Figure 3:
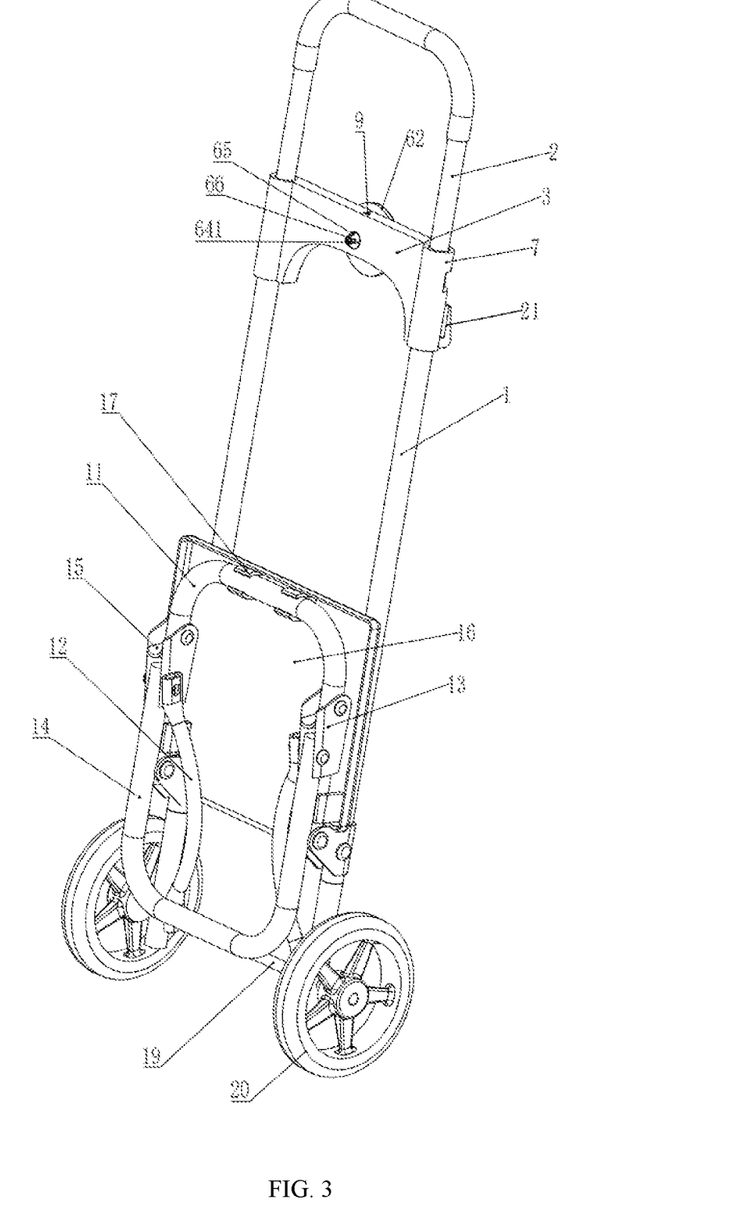
FIG. 3 is a schematic view of the bearing frame in a folded state of the present disclosure.
Figure 6:
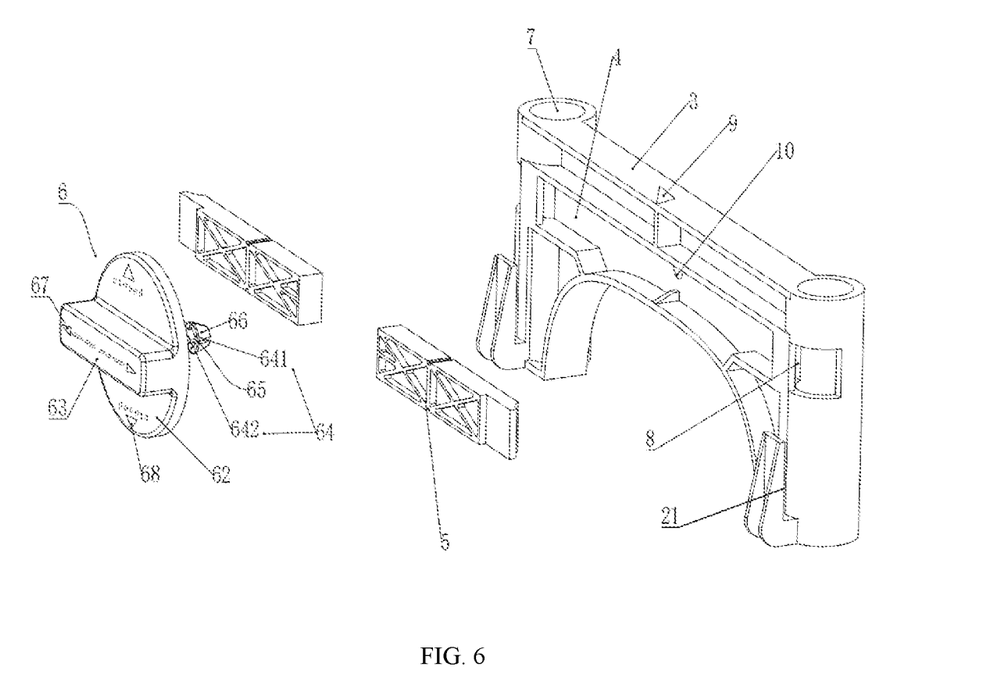
FIG. 6 is an exploded view of the present disclosure.
Figure 8:
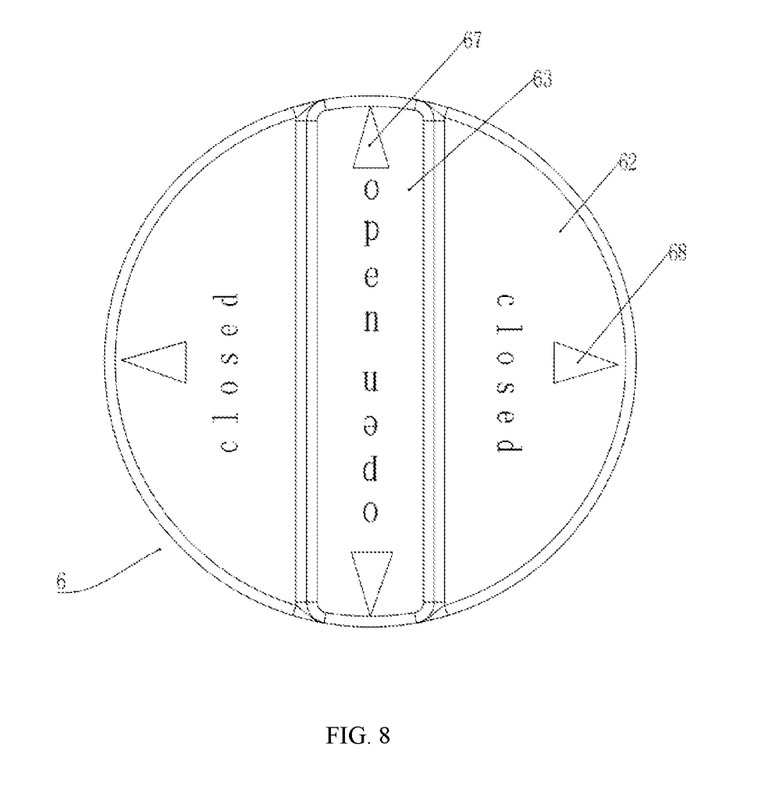
FIG. 8 is a second schematic view of parts of the knob of the present disclosure.

Referring to FIG. 2, FIG. 6, and FIG. 8, the knob 6 further includes an intermediate disc 62 and a strip-shaped gripping part 63. The gripping part 63 and the lock block 61 are respectively located on two sides of the intermediate disc 62. The gripping part 63 and the intermediate disc 62 are respectively provided with an open state identifier 67 and a locked state identifier 68. Indicated orientations of the locked state identifier 68 and the open state identifier 67 are perpendicular to each other. A current state identifier 9 is arranged on the mounting frame 3. The knob 6 can be rotated to enable the open state identifier 67 or the locked state identifier 68 to point to the current state identifier, and then, whether the sliding rod 5 and the sub-pipe 2 are in an unlocked state or a locked state can be visually displayed, so the user is convenient to observe and use.

Preferably, two open state identifiers 67 and two locked state identifiers 68 are provided.

Referring to FIG. 1, FIG. 3, FIG. 6, and FIG. 7, the knob 6 includes a plurality of clamping hooks 64. The clamping hook 64 includes a hook portion 641 and a neck portion 642. The mounting frame 3 is provided with a shaft hole 10. The neck portion 642 is rotationally connected to the shaft hole 10. An avoidance gap 65 is formed between adjacent clamping hooks 64. The hook portion 641 is provided with a conical surface 66. The clamping hook 64 passes through the shaft hole 10 and can be rotationally connected to the shaft hole 10 by the neck portion 642, and the clamping hook 64 has a simple structure and is easy to process and produce. In the process of extending the clamping hook 64 into the shaft hole 10, the inside of the shaft hole 10 passes through the conical surface 66, and the avoidance gap 65 shrinks inwards until the neck portion 642 is clamped in the shaft hole 10, thereby facilitating the clamped mounting of the clamping hook 64 and the shaft hole 10.

Preferably, four clamping hooks 64 are provided. Preferably, the clamping hooks 64 are uniformly distributed in a circumferential direction.

Preferably, the gripping part 63, the intermediate disc 62, the lock block 61, and the clamping hook 64 are integrally formed.

The mounting frame 3 is provided with mounting cylinders 7 for the sub-pipes 2 to pass through. The mounting cylinder 7 is provided with an avoidance hole 8. The avoidance hole 8 is in communication with the mounting cylinder 7 and the sliding groove 4. When the sliding rod 5 tightly abuts and locks the sub-pipe 2, the mounting cylinder 7 can provide a radial force to support the sub-pipe 2, so that the locked state of the sub-pipe 2 is more stable.

Figure 4:
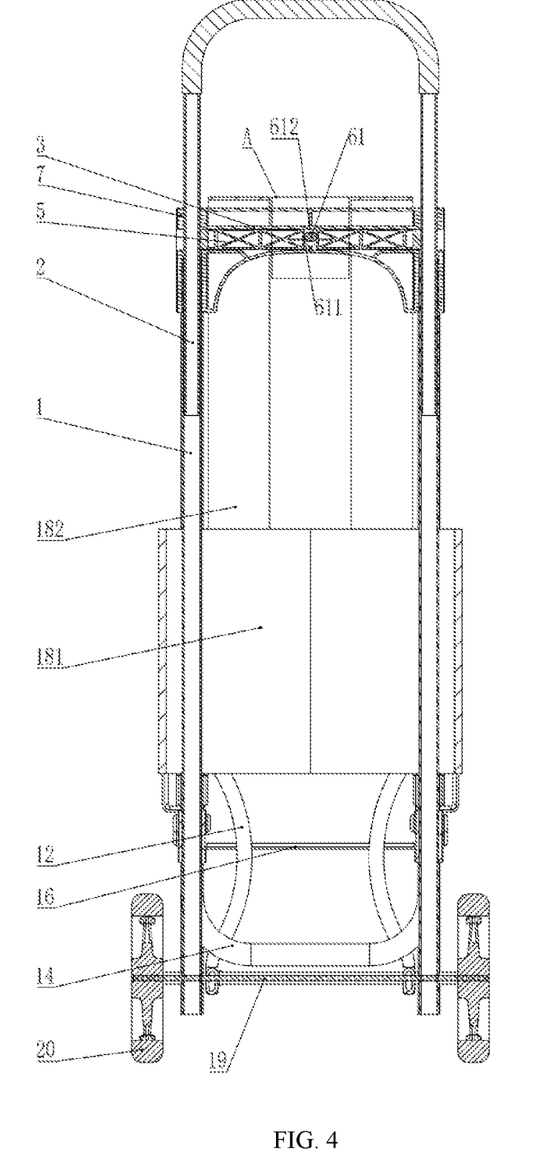
FIG. 4 is a cross-sectional view of the structure of the present disclosure.
Figure 5:
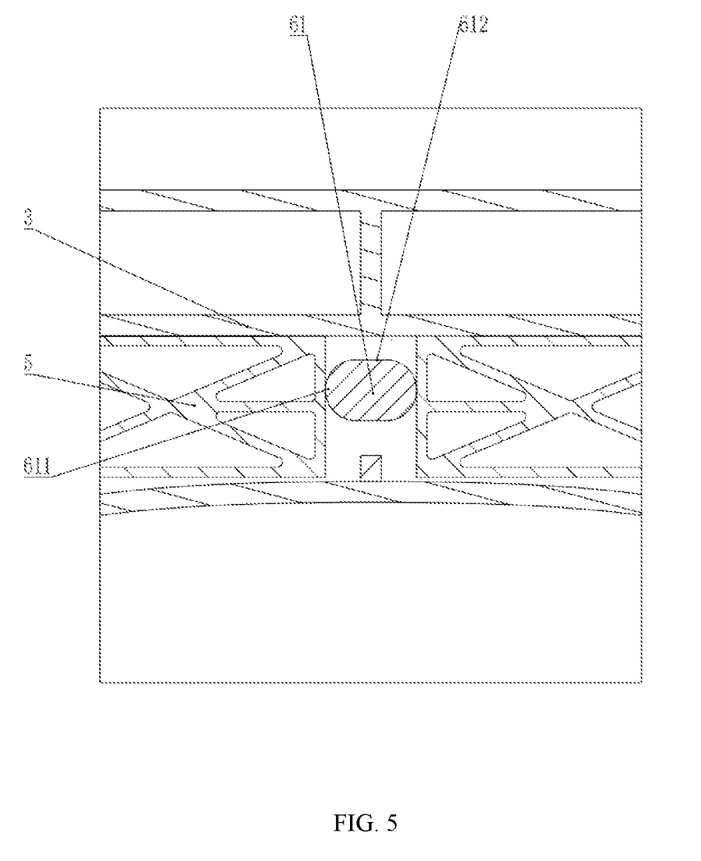
FIG. 5 is an enlarged view showing part of a position A in FIG. 4.
Figure 7:
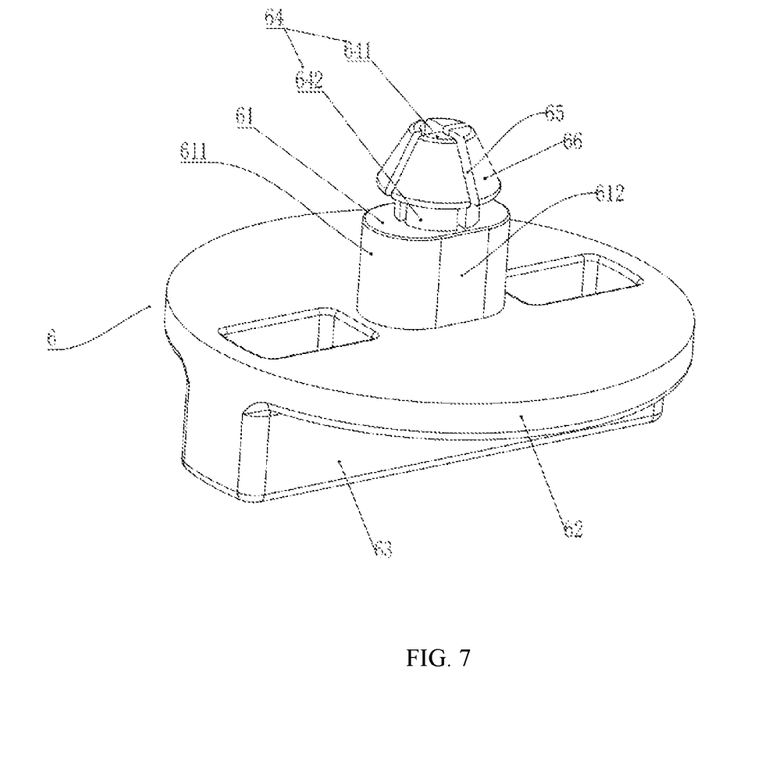
FIG. 7 is a first schematic view of parts of a knob of the present disclosure.

Referring to FIG. 4, FIG. 5, and FIG. 7, a contour of the lock block 61 in a circumferential direction is racetrack-shaped, diamond-shaped, or elliptical. The lock block 61 has a simple shape and is easy to process. All parts on the contour of the lock block 61 in the circumferential direction are symmetrical around a center of the rotation axis of the lock block 61, so that the lock block 61 at any angle has the same limiting effect on the sliding rods 5 on both sides.

In the present disclosure, preferably, the contour of the lock block 61 in the circumferential direction is racetrack-shaped.

The connecting element 13 is fixedly connected with a support frame 14, and the connecting element 13 is provided with a notch 15. When the bearing frame 11 is clamped in the notch 15, the bearing frame 11 is unfolded outwards to a limit state. When the bearing frame 11 is folded to a limit state, a spatial plane where the bearing frame 11 is located is parallel to a spatial plane where the support frame 14 is located. When the notch 15 is clamped with the bearing frame 11, a maximum unfolding angle of the bearing frame 11 is limited, so that the bearing frame 11 is more convenient to unfold. When the bearing frame 11 is folded to the limit state, the spatial plane where the bearing frame 11 is located is parallel to the spatial plane where the support frame 14 is located, so that the space volume occupied by the cart in a folded state is smaller.

Referring to FIG. 1 to FIG. 4, the cart provided by the present disclosure further includes an accommodating bag 18. The accommodating bag 18 includes a bag body 181, hanging straps 182, and a connecting strap 183. Both ends of the connecting strap 183 are connected to the bag body 181. The main pipe 1 is located between the bag body 181 and the connecting strap 183. Two ends of the hanging strap 182 are connected to the bag body 181 and the connecting strap 183. The hanging strap 182 is hung on the mounting frame 3. The capability of the present disclosure to accommodate articles is increased, and the accommodating bag 18 can be mounted more firmly by the arrangement of the hanging strap 182 and the connecting strap 183.

The mounting frame 3 is provided with hooks 21. The hooks 21 can be configured to hang articles, thereby increasing the capability of the present disclosure to carry articles.

Referring to FIG. 1 to FIG. 8, when the knob 6 is mounted, it is necessary to first insert the two sliding rods 5 symmetrically into the sliding grooves 4 on two sides and then extend the clamping hook 64 into the shaft hole 10, the inside of the shaft hole 10 passes through the conical surface 66, and the avoidance gap 65 shrinks inwards until the neck portion 642 is clamped in the shaft hole 10.

During use, first, the sub-pipe 2 slides to an appropriate position relative to the main pipe 1. If the knob 6 is rotated until the locked state identifier 68 points to the current state identifier, the far end 611 pushes the sliding rod 5 to enable the end of the sliding rod 5 to tightly abut and lock the sub-pipe 2. If the knob 6 is rotated until the open state identifier 67 points to the current state identifier, the near end 612 loosens the sliding rod 5 to release the locking between the end of the sliding rod 5 and the sub-pipe 2.

The bearing frame 11, the connecting rod 12, and the connecting element 13 can be folded and unfolded relative to the main pipe 1. When the bearing frame 11 is unfolded outwards to a limit state, the bearing frame 11 is clamped in the notch 15. When the bearing frame 11 is folded to a limit state, the spatial plane where the bearing frame 11 is located is parallel to the spatial plane where the support frame 14 is located.

The above embodiments are only preferred embodiments of the present disclosure, and are not intended to limit the patent scope of the present disclosure. All equivalent structural transformations made using the specification and accompanying drawings of the present disclosure, or directly/indirectly applied in other related technical fields under the inventive concept of the present disclosure are included in the scope of patent protection of the present disclosure.

What is claimed is:

1. A cart, comprising a pull rod mechanism, a folding bracket mechanism, and a pull rod locking apparatus, wherein the pull rod mechanism comprises main pipes and sub-pipes connected telescopically; one end of the sub-pipe is inserted into the main pipe; and two main pipes and two sub-pipes are provided;

the folding bracket mechanism comprises a bearing frame, connecting rods, and connecting elements; the bearing frame is rotationally connected to the main pipe; the connecting rod is rotationally connected to the main pipe; the connecting element is rotationally connected to the bearing frame and the connecting rod simultaneously; the connecting element is fixedly connected with a support frame; a transverse rod is arranged on the main pipe; the transverse rod is rotationally connected with rollers; the main pipe, the bearing frame, the connecting rod, and the connecting element form a four-rod mechanism; the bearing frame is detachably connected with a support plate; a plurality of buckles are arranged at a bottom of the support plate; the whole bearing frame is U-shaped; and a shape of the buckle is adapted to a cross-sectional shape of the bearing frame; and the pull rod locking apparatus comprises a mounting frame, sliding rods, and a knob; the mounting frame is fixedly connected between the two main pipes; the mounting frame is symmetrically provided with two sliding grooves; two sliding rods are provided and are slidably connected in the two sliding grooves respectively; the knob comprises a lock block; the lock block is circumferentially provided with far ends and near ends; a distance between the far end and a rotation axis of the knob is greater than a distance between the near end and the rotation axis of the knob; two far ends and two near ends are provided, and both the two far ends and the two near ends are symmetrical around a center of the rotation axis of the knob; and when the knob is rotated until the far end abuts against the sliding rod, an end of the sliding rod tightly abuts and locks the sub-pipe.

2. The cart according to claim 1, wherein the knob further comprises an intermediate disc and a strip-shaped gripping part; the gripping part and the lock block are respectively located on two sides of the intermediate disc; the gripping part and the intermediate disc are respectively provided with an open state identifier and a locked state identifier; indicated orientations of the locked state identifier and the open state identifier are perpendicular to each other; and a current state identifier is arranged on the mounting frame.

3. The cart according to claim 2, wherein the knob comprises a plurality of clamping hooks; the clamping hook comprises a hook portion and a neck portion; the mounting frame is provided with a shaft hole; the neck portion is rotationally connected to the shaft hole; an avoidance gap is formed between adjacent clamping hooks; and the hook portion is provided with a conical surface.

4. The cart according to claim 3, wherein the mounting frame is provided with mounting cylinders for the sub-pipes to pass through; the mounting cylinder is provided with an avoidance hole; and the avoidance hole is in communication with the mounting cylinder and the sliding groove.

5. The cart according to claim 4, wherein a contour of the lock block in a circumferential direction is racetrack-shaped, diamond-shaped, or elliptical.

6. The cart according to claim 5, wherein the connecting element is provided with a notch; when the bearing frame is clamped in the notch, the bearing frame is unfolded outwards to a limit state; and when the bearing frame is folded to the limit state, a spatial plane where the bearing frame is located is parallel to a spatial plane where the support frame is located.

7. The cart according to claim 6, further comprising an accommodating bag, the accommodating bag comprising a bag body, hanging straps, and a connecting strap; both ends of the connecting strap being connected to the bag body; the main pipe being located between the bag body and the connecting strap; two ends of the hanging strap being connected to the bag body and the connecting strap; and the hanging strap being hung on the mounting frame.

8. The cart according to claim 7, wherein the mounting frame is provided with hooks.

\* \* \* \* \*